(12) United States Patent
Rosenthal et al.

(10) Patent No.: US 11,049,056 B2
(45) Date of Patent: Jun. 29, 2021

(54) DISCOVERY OF SENSITIVE DATA LOCATION IN DATA SOURCES USING BUSINESS/ENTERPRISE APPLICATION DATA FLOWS

(71) Applicant: Secupi Security Solutions Ltd, Ramat Efal (IL)

(72) Inventors: Alon Rosenthal, Ramat Efal (IL); Dotan Adler, Ramat Efal (IL)

(73) Assignee: Secupi Security Solutions Ltd, Ramat Efal (IL)

( * ) Notice: Subject to any disclaimer, the term of this patent is extended or adjusted under 35 U.S.C. 154(b) by 709 days.

(21) Appl. No.: 15/279,755

(22) Filed: Sep. 29, 2016

(65) Prior Publication Data
US 2017/0091680 A1     Mar. 30, 2017

Related U.S. Application Data

(60) Provisional application No. 62/235,331, filed on Sep. 30, 2015.

(51) Int. Cl.
*G06Q 10/06*     (2012.01)

(52) U.S. Cl.
CPC ..... *G06Q 10/0635* (2013.01); *G06Q 10/0633* (2013.01)

(58) Field of Classification Search
CPC .............. G06Q 10/0635; G06Q 10/0633
See application file for complete search history.

(56) References Cited

U.S. PATENT DOCUMENTS

| | | | |
|---|---|---|---|
| 6,460,141 B1* | 10/2002 | Olden | G06F 21/604 726/12 |
| 8,005,697 B1* | 8/2011 | Cohen | G06Q 10/06 705/7.13 |
| 8,856,869 B1* | 10/2014 | Brinskelle | H04L 63/08 726/12 |
| 9,438,491 B1* | 9/2016 | Kwok | H04L 43/065 |
| 10,250,640 B2* | 4/2019 | Redlich | G06Q 10/10 |
| 2006/0075228 A1* | 4/2006 | Black | H04L 63/0428 713/167 |
| 2011/0153352 A1* | 6/2011 | Semian | G06Q 10/06 705/2 |
| 2015/0326601 A1* | 11/2015 | Grondin | G06F 16/24578 726/25 |
| 2016/0132696 A1* | 5/2016 | Vidhani | G06F 21/6245 726/28 |
| 2016/0301708 A1* | 10/2016 | Grondin | H04L 63/1433 |
| 2016/0371617 A1* | 12/2016 | Mullaney | G06Q 10/0635 |
| 2017/0011232 A1* | 1/2017 | Xue | H04M 3/5175 |

* cited by examiner

*Primary Examiner* — Saleh Najjar
*Assistant Examiner* — Devin E Almeida
(74) *Attorney, Agent, or Firm* — Graeser Associates International Inc; Dvorak Graeser

(57) ABSTRACT

A plurality of users connect to an application sending requests over a transport and receiving responses from an application that contain sensitive data. For each user request, the application runs one or more data requests and commands to various data sources or other information systems which return the sensitive data. The application then processes the data and returns is to the user as is or processed based on some business logic. The application includes a run-time environment—where the application logic is executed.

4 Claims, 12 Drawing Sheets

---

System presents the filtered data response; (optionally the user can manually change or trace the data) (stage 1)

System matches the sensitive data value from stage 1 to the various user responses and/or result sets of the data-source; Optionally the user can review and optionally correct this match (stage 2)

System builds a metadata set in regard to the data (stage 3)

System creates a policy to detect, audit and prevent exposure according to any application or data function, and/or metadata thereof (stage 4)

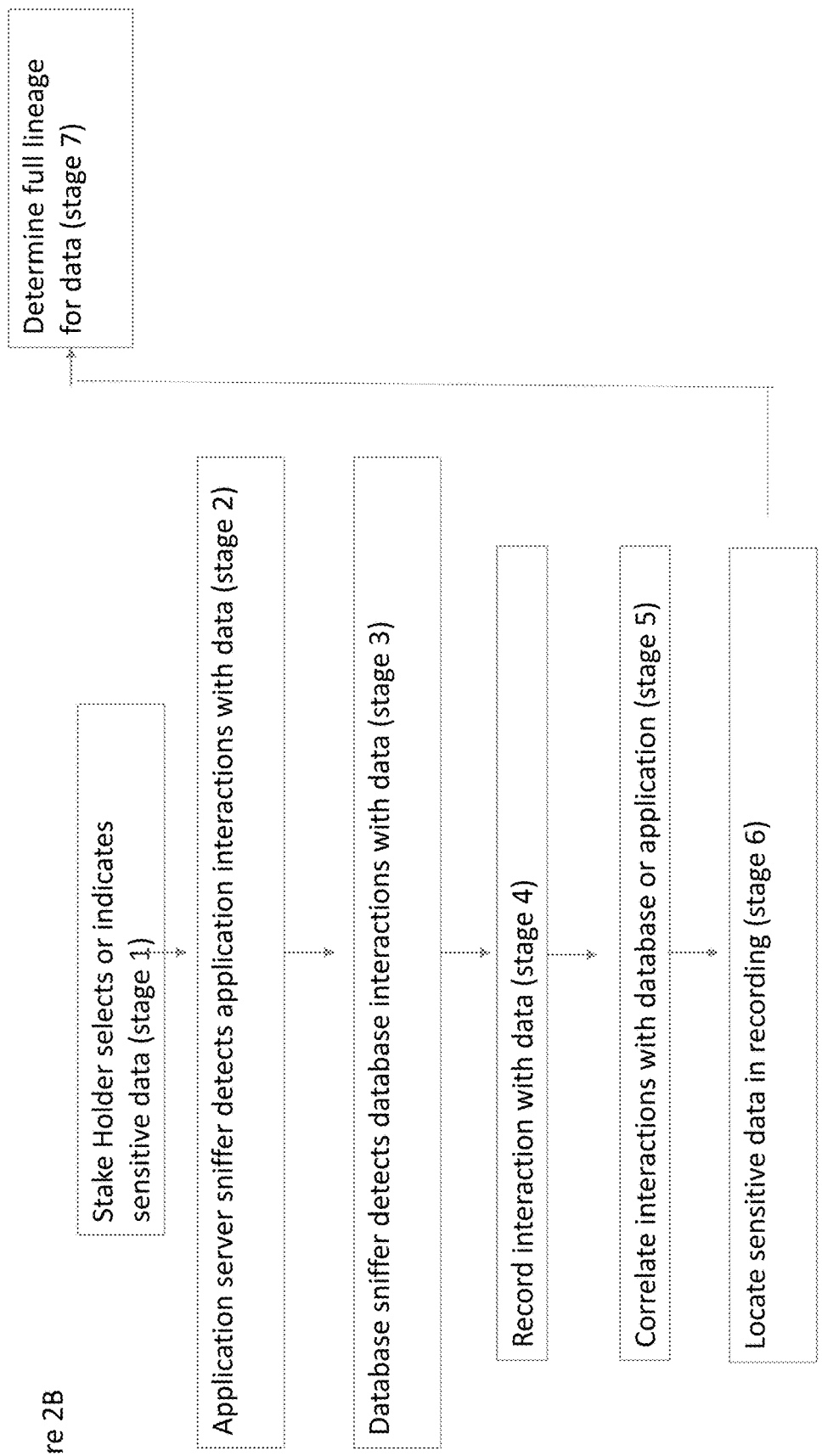

Figure 3A

The user makes a user request (stage 1)

Application agent collects data related to the specific user request and response(s) (stage 2)

System filters the collected data (stage 3)

Figure 3B

The user makes a user request (stage 1)

Network sensors record all data source requests and results that occur between the time that the user request is sent and the user response is provided (stage 2)

System filters the collected data (stage 3)

DISCOVERY OF SENSITIVE DATA LOCATION IN DATA SOURCES USING BUSINESS/ENTERPRISE APPLICATION DATA FLOWS

FIELD OF THE PRESENT INVENTION

The present invention relates to a process of discovering sensitive information using enterprise/business applications.

BACKGROUND OF THE PRESENT INVENTION

Today, many banking, insurance, telecom and health companies maintain thousands of sensitive applications that are exposed on a daily basis to thousands of end-users, partners, clients, part time workforce, new hires and resignations. With sensitive data such as personal information, medical information and sensitive financial data being exfiltrated by malicious insiders and hackers that hijack user identities—organizations must be able to detect sensitive data exposure by malicious insiders and hackers in real-time. In addition, increasing regulations and industry standards require fine-grained audit of "who" accessed "what", "when" and "where".

Without wishing to be limited in any way, the term enterprise/business application often relates to a situation in which a plurality of users connect to an application sending requests and receiving responses from the application that contains sensitive information. Also optionally, additionally or alternatively, such an application may feature submission of a request from a remote program using an application program interface (API) which is processed by the application, performing a transaction or responding with a respond with sensitive information.

For simplicity, the term "user request" is referred to herein as both a request that is submitted by a human user or a request submitted by a computer program. For each user request, the application runs one or more data requests and commands to various data sources which return the sensitive data. The application includes a run-time environment—where the application logic is executed and a data source (such as a database, file, application program interface or an Enterprise Application Integration solution—EAI)—where sensitive information is stored, accessed by the application.

The challenge is that these data sources are highly complex, thus requiring tedious human effort to discovering what tables, columns. API calls and files the sensitive data is found. As the location is unknown, the monitoring, classifying, ranking and detecting suspicious exfiltration events and protection of the data becomes an impossible task.

Therefore, there is a need for a process for fast and accurate discovery, and monitoring, of sensitive data in a transparent, generic and context-rich scalable way.

SUMMARY

According to at least some embodiments, a plurality of users and/or an application program interface (API)) connect to an application, sending requests over a network and receiving responses from an application that contain sensitive data, and/or applying a command to manipulate sensitive data. For each user request, the application runs one or more data requests and commands to various data sources or other information systems which return the sensitive data. The application then processes the data and returns is to the user as is or processed based on some business logic. The application includes a run-time environment—where the application logic is executed.

The existing approach of discovering sensitive information in databases includes scanning the data source objects (for example and without limitation, a database, file system or Hadoop cluster) with sensitive data samples and patterns (usually based on regular expression). As these data sources are large and complex, after running this discovery batch process for hours, it results in the detection of hundreds of suspicious cryptic objects that might be sensitive-including huge amount of clutter (e.g., objects that do not contain sensitive data although it matches a regular expression pattern). The process can both miss objects that do contain sensitive information and can include a large amount of objects that do not contain sensitive information, which then require long and tedious manual cleansing process that is hard and sometimes impossible to perform for most organizations. In addition, monitoring sensitive data exposure requires policies to be defined on a Database Access Monitoring solution (DAM), which is blind to the user request, user response and user context.

To solve the problems mentioned above with precision, speed and agility both on databases AND on other data sources, the present invention, in at least some embodiments, uses a simple and concise discovery tool to identify and map the sensitive data sources.

The present invention features a system and process for discovering sensitive data quickly and effectively, with almost no human effort and with no false results.

The present invention uses the fact that data sources are built for supporting a business/enterprise application (Application).

By having a user play an Application's sensitive user requests or sensitive data flow, the system constructs a complete and accurate discovery of the data flow across different layers or run-time programs and the sensitive data objects within various data sources. A "user" in this context is any entity operating a user application, whether human or automated (such as another software program for example). For example the "user" could optionally be an automated software module for operating the user application and for invoking communications between the user application and the data source.

The present invention describes a system and process to identify sensitive data in the various data sources (database, file, web service, data service, or an Enterprise Application (EAI) hub). For example, in a database the discovery includes but is not limited to schemas, tables, views, stored procedure calls, columns, rows or files and a list of program calls.

It also collects the user requests (such as program call, and/or other interface with an end-user or another front-end application or a scheduled request) and the data-source executable programs that are responsible for the specific data flow of the sensitive data (such as SQL requests and stored procedures in a database source type).

The discovery may optionally be performed in a central manner, across any type of application.

The term application refers to any program software code such as but not limited to application servers and/or a web server in which an end-user or another application or a scheduled request is sending a request to the application, that is sending a request to receive sensitive information from any source (database, file, web service, data service, or an Enterprise Application Integration (EAI) hub).

In a schematic way, each user interaction with an application can be typically presented using the following stages: "user request stage", "data request stage", "data response stage" and "user response stage"

The present invention, in at least some embodiments, requires that an application user or a computer program (for example, an external API call) performs the various actions of the application that retrieve and/or interact with the sensitive information, having the system collect and analyze in parallel the user activities, detecting and mapping all sensitive data flows and data exposure performed by the user actions. The system analyzes the user activity within detailed context from the application in one or more of the following typical application execution stages: "user request stage", "data request stage", "data response stage" and "user response stage". Each stage can include multiple application run-time programs executed on a single or multiple different computer servers (where the data request in the first server is a program call submitted to the second server and so on to other servers) that are responsible for the completion of the specific stage logical function.

The system generates a full lineage between the user-request to data request—the location where the data is stored, and to the data response (result set) and the user-response (output), hence mapping each one of the sensitive data flows into its respective data source objects (e.g., tables, views, columns within a database source) based on execution time interval or similar data values found in the user response and data source response (for example, same number found in the social security number field in the application screen in the application is found in the result set of a database SQL request, or an element in the xml result returned from another server).

The invention, in at least some embodiments, features a system that also generates a full lineage using a program source-code instrumentation, linking to the user application request, between the user response (output) which the application generates in different forms such as HTML, JSON. XML or any other data structure, and the data-source result set.

Identifying the location in the data source result set or in a specific sensitive user response (for example, database result set, returned file, JSON or XML file returned) and using the lineage of the request to the entire related data flow process that involves the various requests to the data sources enables the system to identify the exact table/view column that stores this location, the file or the application program or web service or Application Program Interface (API) in case the data source is another server).

This lineage identifies the underlined objects whenever a sensitive user activity is performed.

BRIEF DESCRIPTION OF THE DRAWINGS

The preferred embodiments of the present invention will hereinafter be described in conjunction with the appended drawings, provided to illustrate and not to limit the present invention, wherein like designations denote like elements, and in which:

FIG. 2B shows another exemplary, non-limiting method for determining sensitive data within the data lineage or function stream, as previously indicated.

FIG. 3A shows a more detailed optional exemplary method for assisting a user to determine which data is sensitive if an application agent is being run.

FIG. 3B shows a non-limiting, exemplary method which is similar to the method shown in FIG. 3A except that it is performed with network sensors.

DETAILED DESCRIPTION OF THE PRESENT INVENTION

Figure 1A:
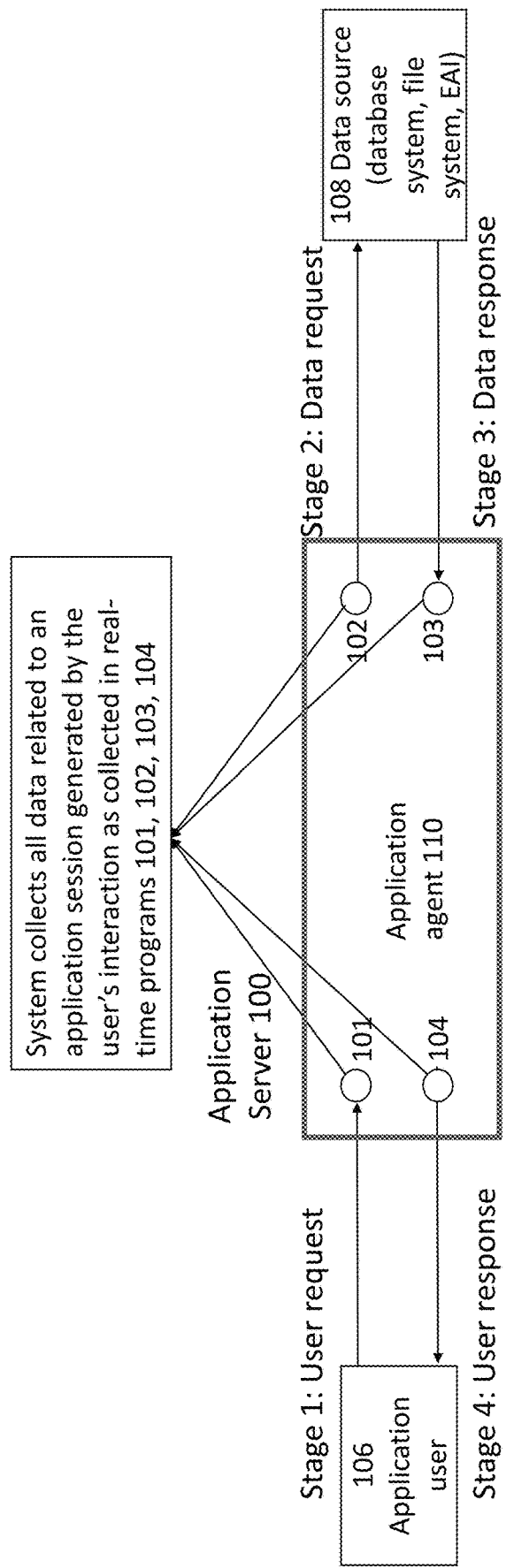
FIG. 1A shows an exemplary, non-limiting system which features an application user 106 communicating with an application server 100, which based on the user request, sends a data request to a data source 108.

While various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention.

The present invention in at least some embodiments relates to a system and method for determining the location, type, sensitivity score and other classification (such as regulation type, sensitivity level) of sensitive data and for then including policies for control of such data according to the determination thereof.

Without wishing to be limited in any way, the present invention, in at least some embodiments, may optionally be described as a system for discovery of sensitive data within various data sources, for example by having a person select sensitive values within application screens, by specifying certain values received or exported by an application program interface calls, or by marking a certain value within the application server programs that contain sensitive data. The system uses various tracking methods to follow its sensitive data flow to the data source request, which is eventually parsed to identify the location or the sensitive table and column names or application program interface call.

For example, the system optionally detects sensitive database tables and columns by marking a field in a screen by an application user, and following its data flow in the application servers to the actual SQL result set that includes the sensitive value and the parsed SQL request to the database—pointing to the sensitive table and column name.

Another example of how the system operates involves starting the process of discovery by manually detecting and listing a comprehensive list of application screens that either present sensitive data, or commit a high-value transaction or any valuable interactions, application program interface calls (APIs), reports or ad-hoc queries that expose sensitive data from data source, including but not limited to database, file, application program interface and web service calls, application program interfaces or an Enterprise Application Integration (EAI) hub (collectively referred to as "screens").

In each one of the application screens or program calls, a discovery of the underlying data flow through the different application layers up to the data source is preferably performed (database, file, big-data MapR program or application program interface API call)—discovering sensitive tables, columns, files or other data sources.

Detecting the lineage between the application screens, reports or APIs to the data source request is preferably performed by using combination of different methods:
1. Using value based matching (matching the sensitive value to the SQL request result set),
2. Time based matching (having only certain users retrieve the data in a non-production environment),
3. Source-code instrumentation that detects the session_id joining the user request to the data source request, database agent or application server agent.

For completeness of the discovery process, the security administrator preferably marks for each sensitive value a sensitivity score and corresponding data classifications, which the discovery process is matching in each one of the user's data source responses or application program interface (API) results. Once the value is detected in the data source response/API response, parsing is performed on the data source request/API request call to identify the relevant data source item that contains the sensitive data.

According to at least some embodiments, the system may optionally feature computer program code that is injected into different application run-time program codes retrieving application transaction context that is performed as a result of the application screen interaction or application program interface request. Additional lineage detection options include identifying the data flows using network sensors, application logs, or database agents, or end point agents that collect the context on the requests and responds that are performed to fulfill each item in the comprehensive list.

When computer program code is injected into different application run-time programs, the unique user session_id identifier is detected in each step in the data flow, thus is able to link it with its corresponding data source requests (for example, for relational databases, the user request to a sensitive field within a window has the same session_id to the SQL request and data result set).

In addition, the injected computer program code can manipulate the request header, request details or other variables in other stages (e.g., SQL request) in order to be able to detect the request in other layers in the application data flow (for example, adding a unique header_id in the request header that can be intercepted by a network sniffer or another agent or adding a hint in the SQL request that can be detected by a database agent).

These requests and responses are parsed and analyzed to detect the sources of the sensitive data. These sources can be for example, schema, table and column in a database, file, or an XML sent from the server to another server via a web service or an application program interface.

An application may optionally be operated by any computational device, including but not limited to a single server, a Virtual Server, a laptop, or a mobile device, or on a cluster of such computational devices.

The discovery system as described herein may optionally include a computer program code that is injected into a specific application run-time program code. The injected computer program code includes the ability to both identify the user mouse text selection and using this value to pop-up a screen for the user to specify the sensitivity score of this value, the name and classification it belongs to.

With the sensitive value and corresponding sensitivity score and classification, it searches the sensitive value within different values it found in different result set related to the user session thread (referred as "session tracking id") of the user request from initiation to completion across the request execution stages (referred to as "lineage"). The tracking includes all request context such as user information, application information, request information (e.g. user computer IP address, requested URL, request headers, cookies etc), and data information (e.g. all parsed SQL requests and typed results, outbound http requests and responses, etc). The program code (that is injected) may optionally also add or change a value in the user request or data source request for marking the specific transaction. This marking can be used by the data source and/or another component of the system as described herein to detect the transaction flow by other instances of the discovery system installed on other servers, or data sources.

The discovery system preferably matches the sensitive data values presented within the application screen or added manually by the user, including sensitive transaction values with the data-source request parameter values, returned results set values or application program interface parameter values.

The discovery system preferably performs the search only on related requests in the data flow by using one or more of time based matching, session identifier, and matching the values by applying various data manipulation techniques including but not limited to encoding manipulations, numeric rounding, time and date manipulation, special character (such as spaces, commas, points, end of line), manipulation and predefined data patterns (such as social security number pattern or credit card pattern) that are custom or shared between different installations of the discovery system like a library to detect the set of SQL requests or program calls that expose the sensitive information to the screen.

For a data source type database, the discovery system matches the user request and response (output) to the parsed SQL (the list of column and tables), and also matches the data results (result set) containing the sensitive data with the related parsed SQL requests, and classified as sensitive.

For a data source type application program interface call, the system matches the program returned values containing the sensitive data to accurately identify the specific program call.

Preferably the system parses the SQL text or program calls, generating a comprehensive list of sensitive data sources and objects, tables, views and column names that may contain the sensitive information in the various sources and associates them with the data response and user response, generating part of the lineage between the user-request to the data source elements.

As described herein, terms such as "user request" and the like are understood to involve actions taken through a user computer and/or by a user application.

Turning now to the Figures, as shown in FIG. 1A, there is an exemplary, non-limiting system which features an application user 106, operated by a computational device (not shown), communicating with an application server 100, which based on the user request, sends a data request to a data source 108. Data source 108 may optionally comprise a database system, file system, EAI, program call or any other source of sensitive data.

During its typical operation, user application 106 would send a request to the application server 100 for some type of function, which would involve some type of sensitive data processing and/or sensitive data retrieval (and exposure). This would form the user request as shown. Application server 100 then sends data requests to data source 108 as a result of the user request, in order to retrieve sensitive data or perform the function or to otherwise satisfy the user request (for example, in an application working with a relational database, the user sends a request in a URL form to an application, the application sends a corresponding data request in a SQL format to the database, such as "select customer_name from table_customer". In an application working with an API (not shown), the application might send an XML, JSON or other program interface communication parameter request to the source server, and would then receive a response that includes the sensitive data results. Data source 108 then responds to application server with the data response (in relational database, this is defined as "result set" that is combined from various columns, which some of them might be sensitive)

Application server 100 would then send a response to the user that is to application user 106 (this is commonly referred to as "output"). For the purpose of the present invention, at least in embodiments, application server 100 also features an application agent 110. Application agent 110 collects all data related to the user's interaction as collected in real-time programs 101, 102, 103, and 104. The user request processing in the application server 100 is characterized with a specific session tracking id which is unique to the user request, and which is collected by the application agent 110 in addition to other run-time variables. The application server agent 110 optionally and preferably collects rich-context on each user request/report/program, from the application run-time program as well as from external sources including but not limited to environment context (such time, date), application context (application name, type), user context (name, role, LDAP attribute, hire date, resignation date), session (IP, geolocation, device, custom variables), request context (type, value, variable value, objects, result set size, result set value, output value). This additional context is used to detect the sensitive data flows from the rest.

Application agent 110 is operated by application server 100 and intercepts requests from user application 106 and other directive communication with data source 108 as described above. This interception is necessary in order to determine which data is sensitive. Real-time programs 101, 102, 103, 104 are preferably executed in-line, more preferably before every application program-code that is handling user requests, such as user agent 106, as well as any application program-code that is interfacing with a data source, such as application server 100 and/or software operating data source 108.

Application agent 110 is therefore able to collect and correlate (by comparing the application session tracking id) the sensitive user and data requests (referred to as "lineage") in each one of the run-time programs 101-104, detecting the related flows of sensitive data. These flows are initiated by a user operating user application 106, followed by the application 100 generating a data-source request submitted to the data source 108, followed by the result retuned from the data source to the application 100, and the application output that is returned to the user through user application 106.

That is how the operation of user application 106 and the operation of the application itself and application server 110 correlate to cause sensitive data to be abstracted from or written to data source 108.

When multiple application servers 100 are working in-line to process the user request one after the other, each application with a different session tracking id., the application agent 110 in each application server 100 identifies the requests by adding a unique session remark that identifies the original user request's session tracking id into the communication between the two (or more) application servers (e.g. by adding an header to the request between the parties in case of http requests; multiple application servers not shown). The application server 100 that receives the remark in the communication parses it. These added remarks identify the original user session across different application servers, as the remark is detected and identified by each application agent 110 on each application server 100 respectively.

Figure 1B:
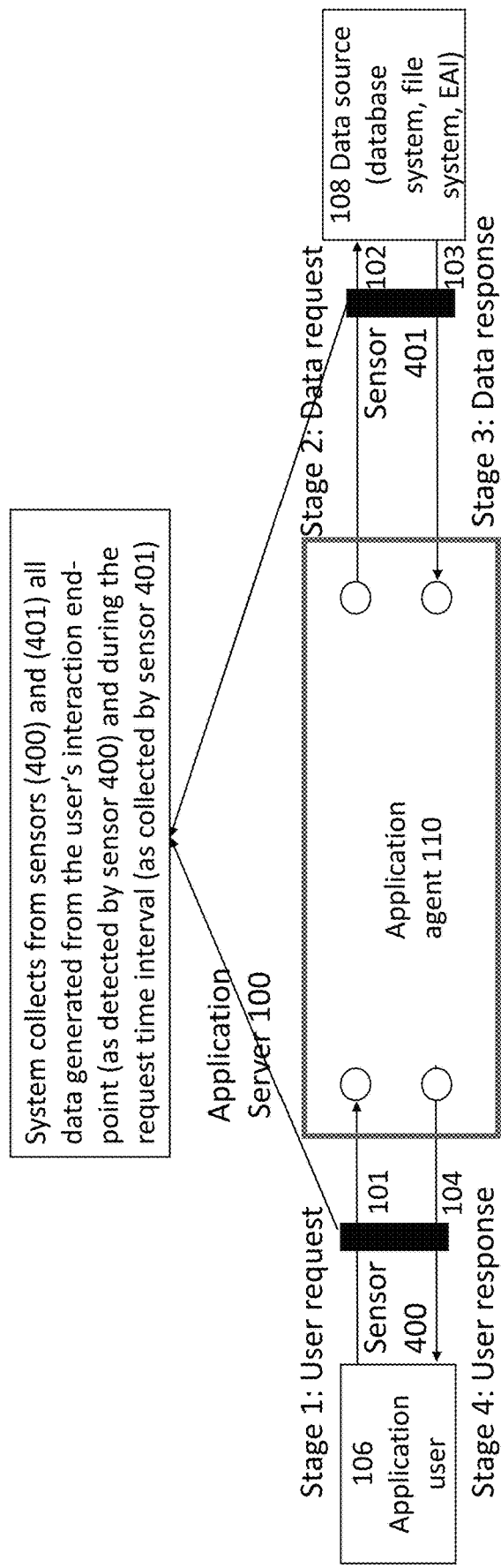
FIG. 1B shows another embodiment of an exemplary, non-limiting system of the present invention.

FIG. 1B shows another embodiment of an exemplary, non-limiting system of the present invention. In this embodiment, optionally application agent 110 is the present application server, but additionally or alternatively there is present a network sensor for 100 which sits between user application 106 and application server 100. Another option is adding sensor 401, a network sensor 401 which sits between application server 100 and data source 108.

In this instance, application agent 110 or another external software module not shown external to application server 100 collects data from sensors for 100 and 401. It's including all data generated from the users, from the application, from the interaction of application user 106 as detected by sensor 400 and also as transmitted to or from data source 108 as collected by sensor 401.

Figure 2A:
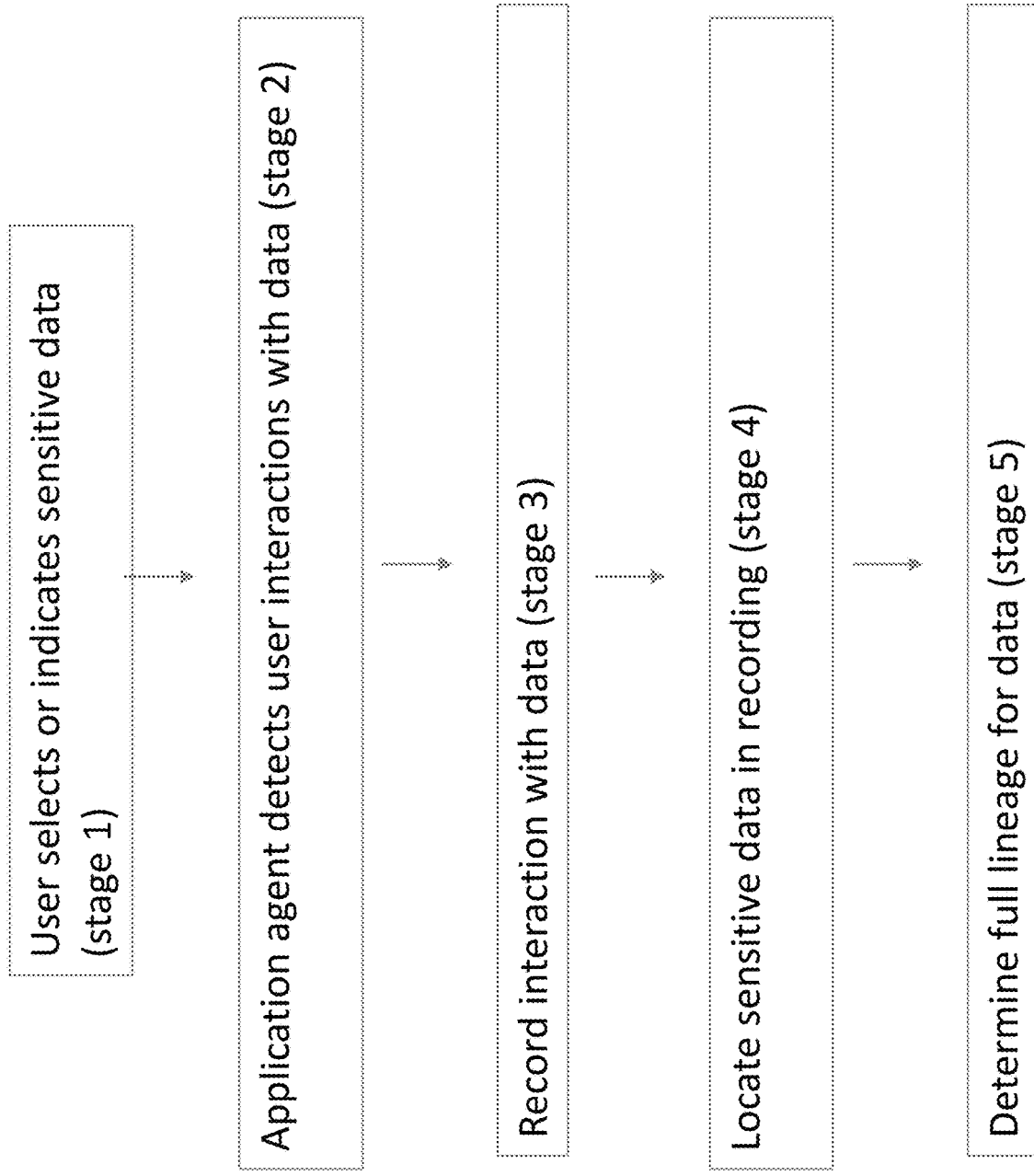
FIG. 2A describes a non limiting exemplary general method for determining the data lineage of sensitive data.

FIG. 2A describes a non limiting exemplary general method for determining the data lineage of sensitive data. By data lineage, it is meant the functionality of that data as it is embedded within the functionality of a particular user running a particular application request to interact with a particular sensitive data The lineage indicates when the data is requested, where it resides within the data source, how it is consumed by the application and by the user.

Turning now to FIG. 2A, in stage one the user selects or indicates sensitive data. The sensitive data may optionally be present when the user opens and interacts in one of a plurality of screens, reports or programs, or alternatively may be simply provided by the user.

According to at least some embodiments, the discovery solution captures the sensitive value from the application screen by adding code instrumentation program instruments the end-user mouse selection, so when the user selects a text within the application screen—the value is captured by the code instrumentation program and sent to the management server.

The sensitive field value, sensitivity score and data classification collected by the program instrumentation code are also preferably sent to the management server. When the user selects a sensitive value in the application screen, the value is sent to the management server, which matches it with all other result sets returned to the user session. When matching occurs, the source of the result set is parsed to detect the source of the value, thus mapping it to the user specified sensitivity score and classification. For example, for a relational database repository, the result set includes the sensitive value, thus matching the value with the parsed SQL request—thus detecting the schema, table and column names that contain the sensitive value.

In stage two, application agent detects user interactions with data. In this embodiment, application agent is operated by the application server and as so is able to detect with lineage (as it collects the application session_id), both interactions with the user application and also with the data source.

Application agent then records the sensitive data flow from the source to the user (destination). By recording all aspects of the interaction with the sensitive data, application agents determines which functions or requests from the user application caused the sensitive data to be requested. These functions or requests preferably include but are not limited to the reaction of the application server to this request, that is the response with additional functionality or information, the response from the data source in reaction to the request for sensitive data, and the like.

The interactions between the user screens and the data requests/responses are recorded sequentially, meaning that interactions which occur earlier are recorded as happening earlier in time and also as occurring earlier in the sequence of events. Interactions which occur later are recorded and determined to be occurring later in the event sequence stream. In addition, the stream itself includes a series of events, which include requests and responses (stages) between the user application, the application server, and the data source. The sensitive data itself both in the result (returned from the data source) and the actual output that the application server is returning to the user are also recorded to determine where it fits in the stream of interactions with the data and to allow to later detect the exact phrases used in the screens.

In stage four, sensitive data is located within the recording. This may actually occur or be performed by application agent. Alternatively, it may be performed by a different system or a remote server or software module.

Locating sensitive data is often preferably done according to policy. Or it alternatively may be done according to managed interaction with the user or according to data which was previously determined to be sensitive and which is used to create a pattern (such as a US social security number using a regular expression), according to which the sensitive data can be located in the recording.

In stage five, the full lineage for the data is indicated. As previously noted, the full lineage indicates the series of functions according to which sensitive data is requested, manipulated, and or provided. Also, the entire function series which leads up to the request of the sensitive data as well as the transmission of the sensitive data itself. This allows the flow of the sensitive data to be traced, including functions or requests leading up to the provision of sensitive data, even before the sensitive data is itself provided.

FIG. 2B shows another exemplary, non-limiting method for determining sensitive data within the data lineage or function stream, as previously indicated. In stage one, the user selects or indicates sensitive data. In stage two, an applications server sniffer detects application interactions with data. In this case, this is not running on the applications server itself, but rather is a sniffer located between the user application and the application server. These detections occur because the sniffer is instructed according to the selection or indication of the sensitive data, for example optionally by determining which application interactions occur with the data and, therefore, which application interactions are relevant.

In stage three, the database sniffer detects database interactions with that data. Again, the database sniffer is not operated by the database resource itself or the data source itself, but rather is located on the network between the database or the data resource and the application server. Again, the database sniffer is instructed to detect these database interactions option preferably according to indications from the stakeholder.

In stage four, again, interactions with the data are recorded as previously described. However, in stage five these interactions need to be correlated with particular data source, database requests, and application requests and user response (output). This is because the application agent is no longer installed and used for detecting the request's session tracking id and able to see the complete data stream, while the sensors only see uncorrelated events (the user request events and the data source request), unable to correlate these events to a cohesive event stream.

Both sensor recordings, and information must be correlated in order to determine the nature of the request and the function and the data for full correlation. In stage six, sensitive data is located in the recording, again, as previously described. In stage seven, the full lineage is determined for the data, again, as previously described.

After the lineage is determined for the sensitive user request using the application agent or using the network sensors, the data source request is parsed to identify the different objects (e.g., in the relational database—the tables and column names that generate the result set) that contain the sensitive data are identified.

FIG. 3A shows a more detailed optional exemplary method for assisting a user to determine which data is sensitive if an application agent is being run. The application agent contains a deterministic lineage between the user request, user response, data source request, and data source response. This is because the application agent records all of the functionality, request and response, from both the user application and also from the data source and, of course, from the application server itself.

This deterministic session tracking id, collected by the application agent, enables the lineage to be determined whether performed in a production environment or a non production environment and with any number of users. A non production environment may optionally include any type of sandbox in which certain functions are provided for testing, but which do not include many concurrent users working simultaneously (preferably fewer than 10 concurrent users). Because fewer users are expected to be working on the non production system, there are only a few or preferably just one user request at a certain time period—thus having a reduced amount of user requests and responses collected by the application sensor, and similarly a reduced amount of data requests and responses collected by the data source sensor on the time interval of the user request and user response events, thus having much less events to correlate, improving the accuracy of the sensor based lineage.

The user in stage one logs into the application and runs a single screen or multiple screens, in order to make a user request. These screens relate to the user application, which is being accessed by the user. Effectively, the user is operating the application in order to locate the sensitive date. The application agent then collects the specific user request, data request, data responses, and user response for the specific user in stage two. The specific user map should be identified according to user client IP, username, or other identification. This information is collected during the time when the user runs the screens. In other words, stages one and two are optionally and preferably performed in parallel.

In stage three, the system optionally through the application agent or alternatively through another software or server, which is external to the application agent, filters the collected data.

The filtration is preferably based upon user information and preferably relates to specific interactions and transactions which were invoked when the user operated the user application.

Preferably, the filtration then excludes noise which may include, for example, background recurring system transactions and other housekeeping functions, which are not directly related to the user's request. The system then collects the application session tracing id for each user request, data request, data response, and user response. By collecting this series of session tracking ids, the system is able to compare the session tracking ids across interactions and network events. All events with the same session tracking id represent a single user interaction—thus lineage containing these events, and the connection between the events, is accurately identified.

Optionally and preferably, the data lineage comprises a history of all functions from a request from the user application to delivery of the data response to the user application by the application server.

Next, the system parses the user request, the data source request, data source response, and the user response in order to track the source of each sensitive data value, such as for example a Social Security number value that has been identified as sensitive by an end-user is found also in the first column within the result set response. Parsing the SQL request enables the system to detect the table and column that populate the first column of the result set—hence identifying the source of the social security number value for example.

FIG. 3B shows a non-limiting, exemplary method which is similar to the method shown in FIG. 3A except that it is performed with network sensors. Again, stage one is performed as for FIG. 3A. Now, however, in stage two the system uses application network sensors and data source network sensors to collect the previously described information. However, there's no application session tracking id because the sensors are not able to determine this from the information they collect over the network.

The system instead records all user requests, data source requests, data source results and user results that occur between the time that the user request is sent and the user response is presented back to the user. However, preferably the clocks (timekeepers) are in sync on all computational devices on the network which are being analyzed. Any other data source requests that are not part of the specific user requests are filtered by using the user IP, type of requests (e.g., if the user retrieves data than all data source requests other than "select" requests are filtered and the time of requests. In stage three, the system again filters the collected data as previously described. However, in this case the system generates and assigns its own assumed user session ID for the potentially related user request, data request, data response, and user response.

The data lineage which is so determined is statistically based and not deterministic. It is possible that these requests and responses are not actually related. The filter is also preferably based on the user IP, type of request and time interval when the user submitted the request and received the results. Preferably, therefore, FIG. 3B is run with a smaller number of users, optionally no more than 10 concurrent users to reduce ambiguity in the lineage. Alternatively or additionally, the method is optionally and preferably run in a non production environment which can otherwise be controlled.

The system parses and relates all stages, including the user request, data request, data response, and the user response. Again, the ultimate goal is to correlate accurately each user response value to a data source response, which is then linked to a data source request element. This enables the functionality of the user application to be linked to the functionality of the application server and ultimately to the sensitive data being requested from the data source.

Figure 4A:
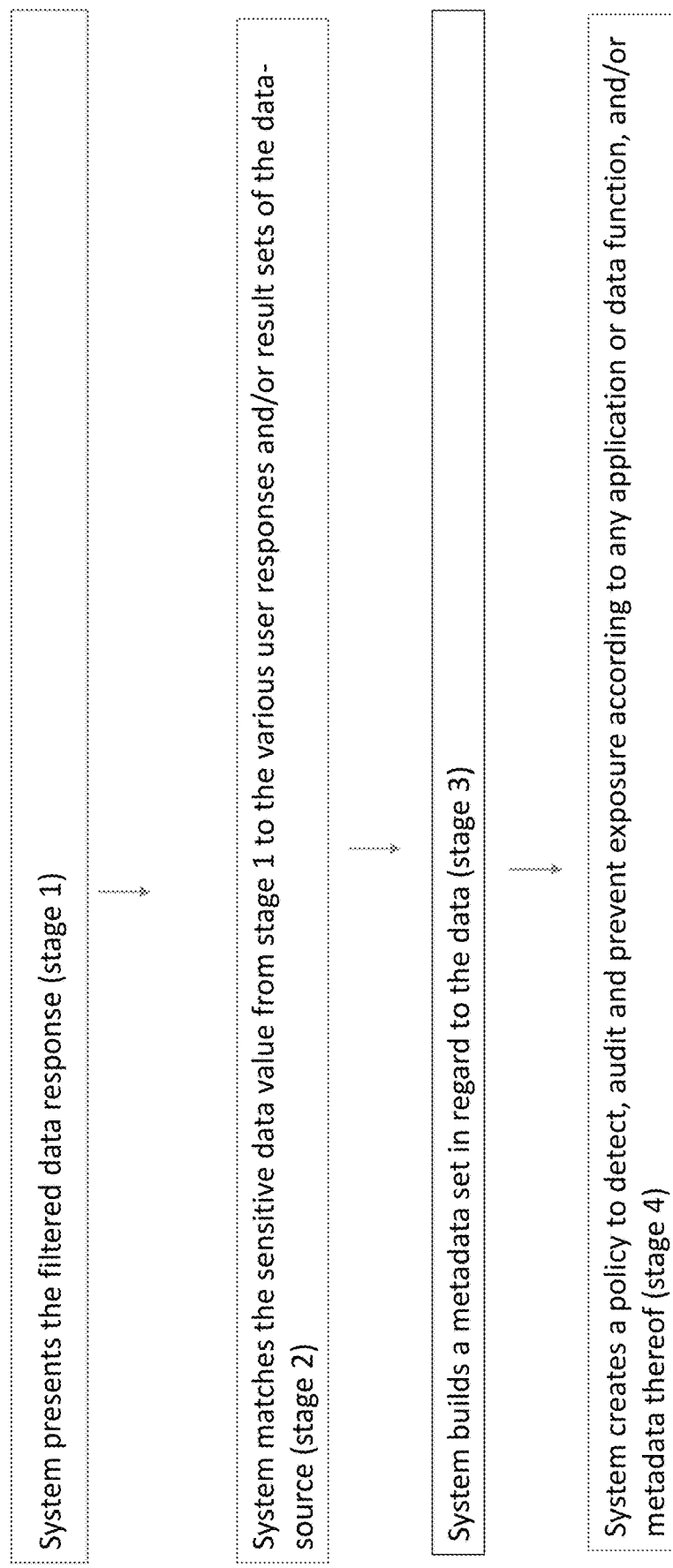
FIG. 4A shows an exemplary optional method for providing the filtered data to users in order to further determine which data is sensitive.

FIG. 4A shows an exemplary optional method for providing the filtered data to users in order to further determine which data is sensitive. Turning now to FIG. 4A, in stage one the user is presented with the filtered data response with any prior sensitivity scores that exist. A sensitivity score may optionally have already been determined by the user through a previous review and or may optionally be determined by alternative software.

The user then specifies for each selected sensitive data response element (such as "Scott Tiger"), a title (Customer name), sensitivity score (e.g., 7), and various classifications (e.g., PII). The user may also optionally manually add other element values where the system will preferably search across user responses and data source responses to identify their data source. In stage two, the system matches the sensitive data value that the user defined in stage one to the relevant user requests. The system also preferably matches the sensitive data value from one of the various result sets of the data source responses, thus able to link it to a particular data source request and data source response. When matching the data, the system may transform the user input and collected input in order to fuzzy-match (match generally and/or probabilistically) the input with the collected data. This is useful for example for handling dates with different time-zones, floating point numbers with different number of digits after the point, rounded numbers etc.

In stage three, the system builds a set of metadata, data which relates to the data itself, in order to be able to locate it within a particular lineage and also to be able to detect it again in actual operation of the system.

The metadata optionally includes, for each sensitive source data element, a title, sensitivity score, various classifications, a request URI, the sensitivity and classification of the data element. Next, in stage four, from this metadata a policy is created to detect, audit, and prevent exposure. Sensitivity score is preferably determined from both user request, such as URI, and data source objects, such as table and columns.

In this case, the policy is optionally able to stand alone. That is to say it may be operated without further manual input and instead is implemented to be able to further detect, not only the presence of sensitive data, but also the requests from the user application and requests from other applications or tools that led to the sensitive data being requested from the data source.

Some non limiting exemplary uses of such detection of building may, for example, optionally be to be able to detect spoofing requests. If data is not requested as part of the full lineage, but instead is requested by an application that is not normally requesting such data, this would be an example of potential fraud, malware, or other illegal or undesired intrusion in the data request process.

Figure 4B:
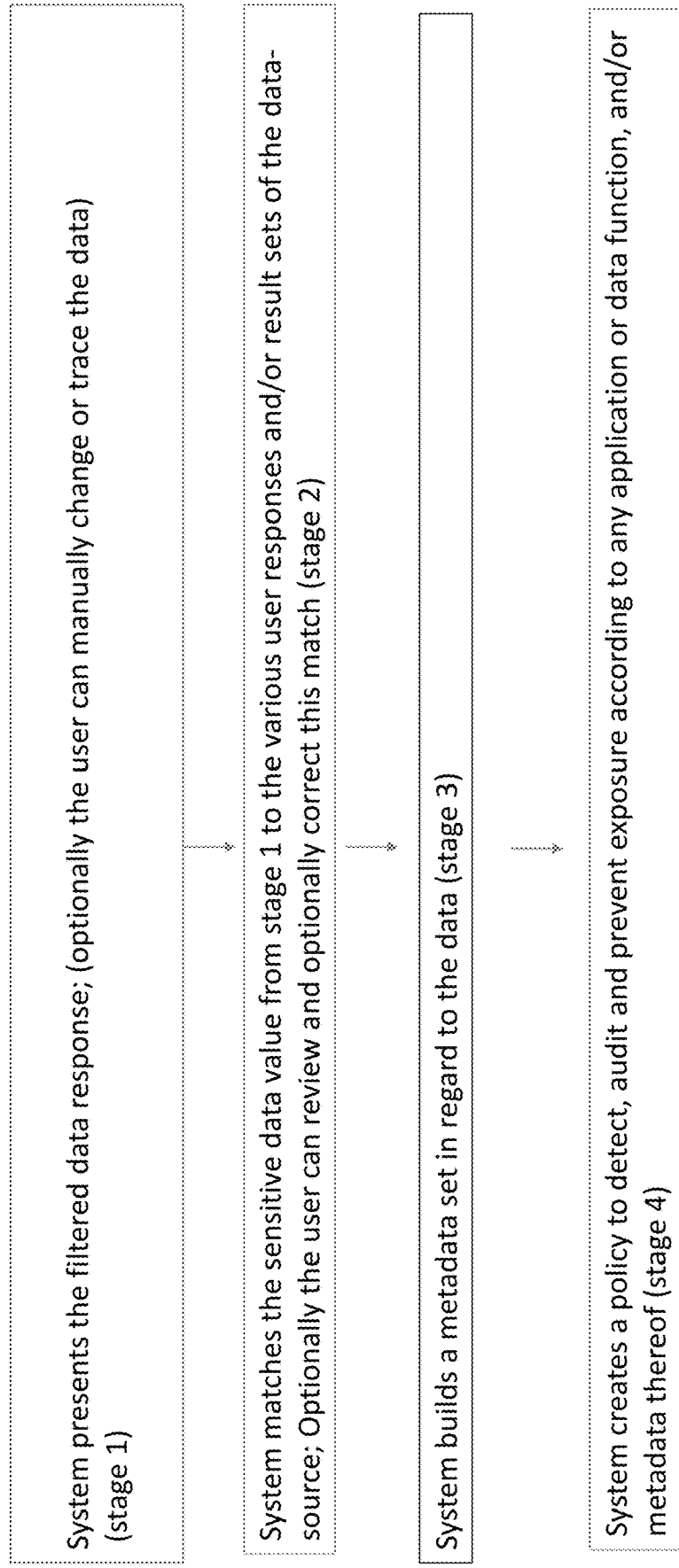
FIG. 4B shows a similar exemplary non-limiting method for the network sensors as in the method of FIG. 4A.

FIG. 4B shows a similar exemplary non-limiting method for the network sensors as in the method of FIG. 4A. However, optionally in FIG. 4B in stage one the user may optionally correct the data response value as well as remove unrelated user requests, and data source requests. The reason for this is that the filtered data response includes a fuzzy lineage. While this lineage is probabilistically determined, it is not deterministic. Therefore, optionally in stage one the user may choose to make corrections and or changes.

In stage two, once the user has fully determined the sensitive data value, the system then proceeds as previously described with FIG. 4A. However, again, the user may optionally be given the chance to correct this matching and assignment because of the necessity to detect false positives, false negatives, and possibly for the user to reassign the system assignment for the match sensitive data value.

Figure 4C:
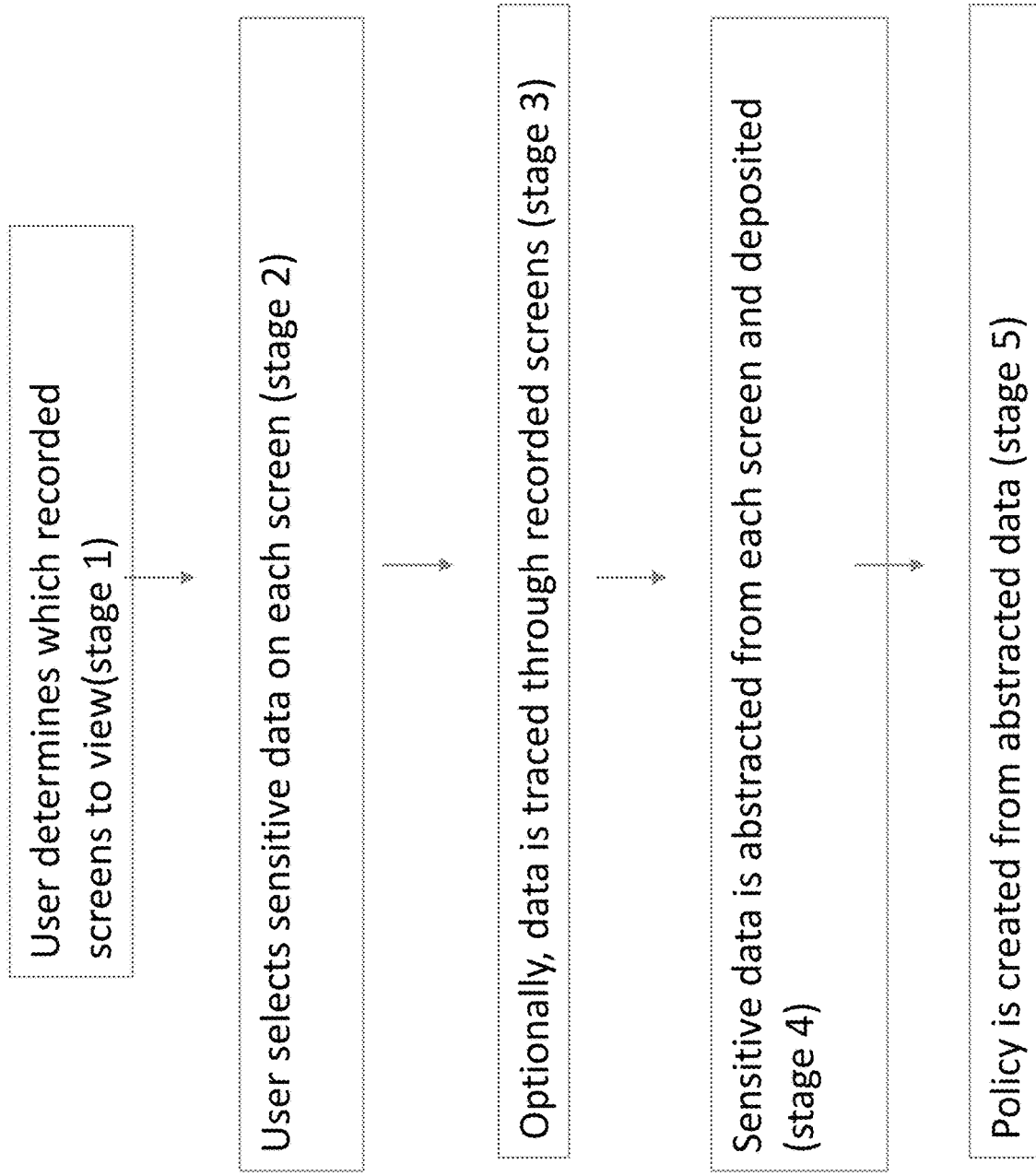
FIG. 4C is a non limiting exemplary method in which a user may actually choose to step through the functions of an application.

In stage three, after stages one and two have been performed and the data has been correctly filtered and matched, the metadata is built as previously described for FIG. 4A. In stage four, the system again creates a policy as described with regard to FIG. 4A. FIG. 4C is a non limiting exemplary method in which a user may actually choose to step through the functions of an application.

For FIGS. 4A and 4B, optionally preferably the application is run until some predefined stopping point or until the application-driven process is complete. In FIG. 4C, however, the user may optionally choose to step through various screens (data displays) and select data as the application is run. In stage one, the user determines which recorded screens to view. These screens are recorded during the operation of FIG. 3 as previously described. The user then selects sensitive data in each screen in stage two.

In stage three, the sensitive data values are optionally traced through the recorded screens. This allows the user to determine if, in fact, the data is sensitive. Such a trace also determines if the system assignment of the functionality that is the data request and data response and user application requests and user application response, as well as application server request and response were determined correctly.

This option may be performed, for example, if network sensors were used to sniff the data and it can be used to correct any errors. Sensitive data is then abstracted from each screen and deposited as described in stage four and a policy is created from the abstracted data in stage five. Stage four also optionally and preferably includes a creation of metadata as previously described.

Figure 5:
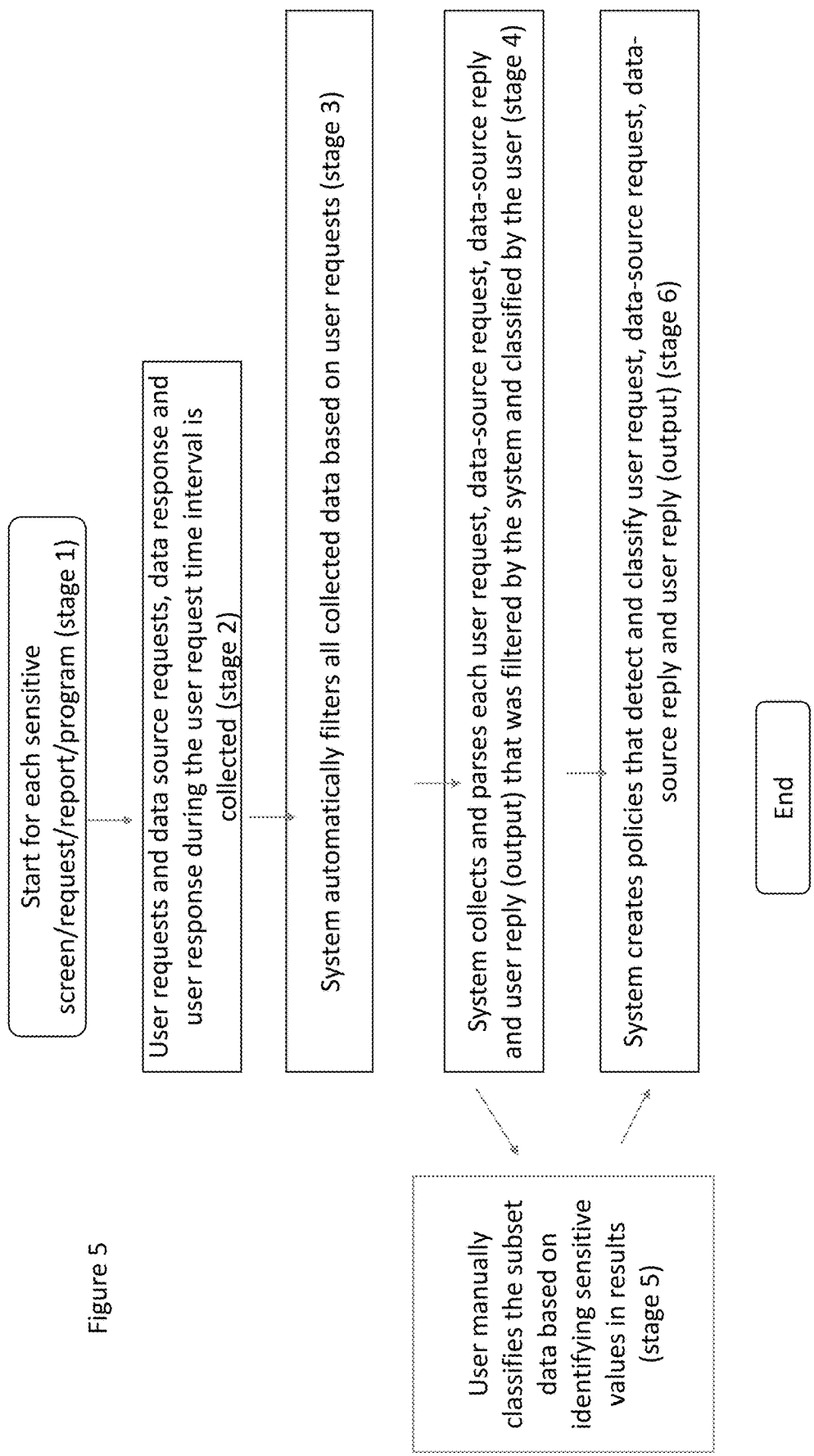
FIG. 5 shows an exemplary, non-limiting method to create a set of policies which may optionally also include manual classification.

FIG. 5 shows an exemplary, non-limiting method to create a set of policies which may optionally also include manual classification.

In stage one, the process is started optionally and preferably for each sensitive screen and or request and or report and or program. The method may then optionally be repeated as necessary in order to cover each sensitive screen, request, report, or program. In stage two, the user requests and data source requests, data response and user response during the user request time intervals collected. This collection is preferably performed through recording as previously described.

In stage three, the system automatically filters all collected data based on user identification, request time, request type and results. In stage four, the system collects and parses each user request, data source request, data response and user response that was filtered by the system and classified by the user. Optionally and preferably then the user mainly classifies the subset data based on identifying sensitive values and results in stage five.

This process may also optionally be combined with the process of FIG. 4C, which was previously described. Next, in stage six the system creates policies that detect and classify application requests. Optionally, the user may determine for at least some user requests and data source requests that this method should pass directly from stage four to stage six. In that case, stage five is bypassed.

Figure 6A:
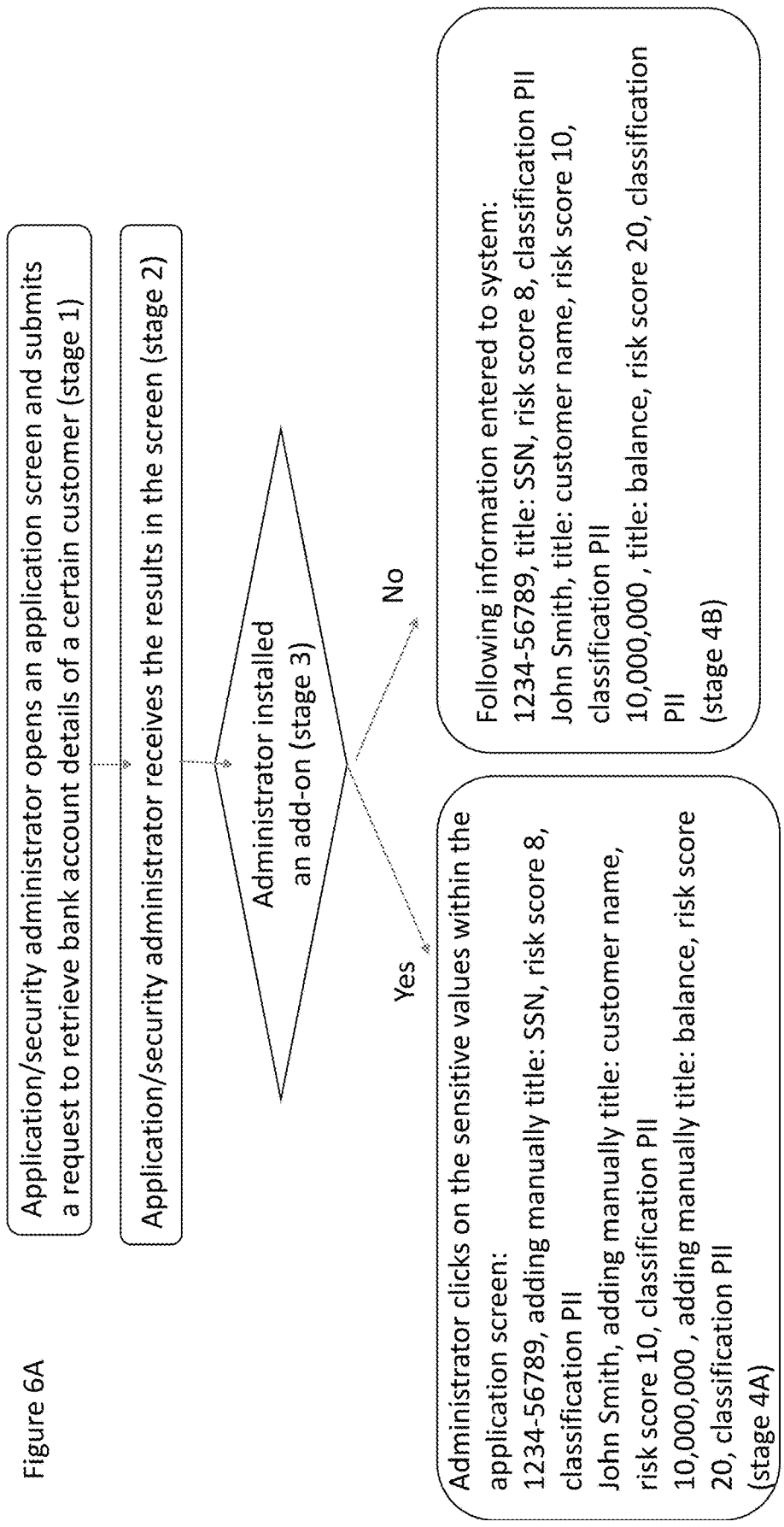
FIGS. 6A and 6B show exemplary, non-limiting methods for collecting and analyzing user application requests and data source (database) responses.

FIG. 6A shows an exemplary application/security administrator that accesses an application screen to discover and classify sensitive information within an application—in this example, as shown in stage 1, bank details are requested.

The screen returns information which some of which is sensitive in stage 2. In stage 3, the process works according to whether the administrator has an add-on software which is able to read the information on the screen and allow for its selection. If this software is present, the administrator can click on the application screen and the administrator actions are recorded by the add-on software (stage 4a). If not then the information is added manually (stage 4b).

In either case, the administrator optionally and preferably adds title, sensitivity score, and classification for each sensitive value.

Figure 6B:
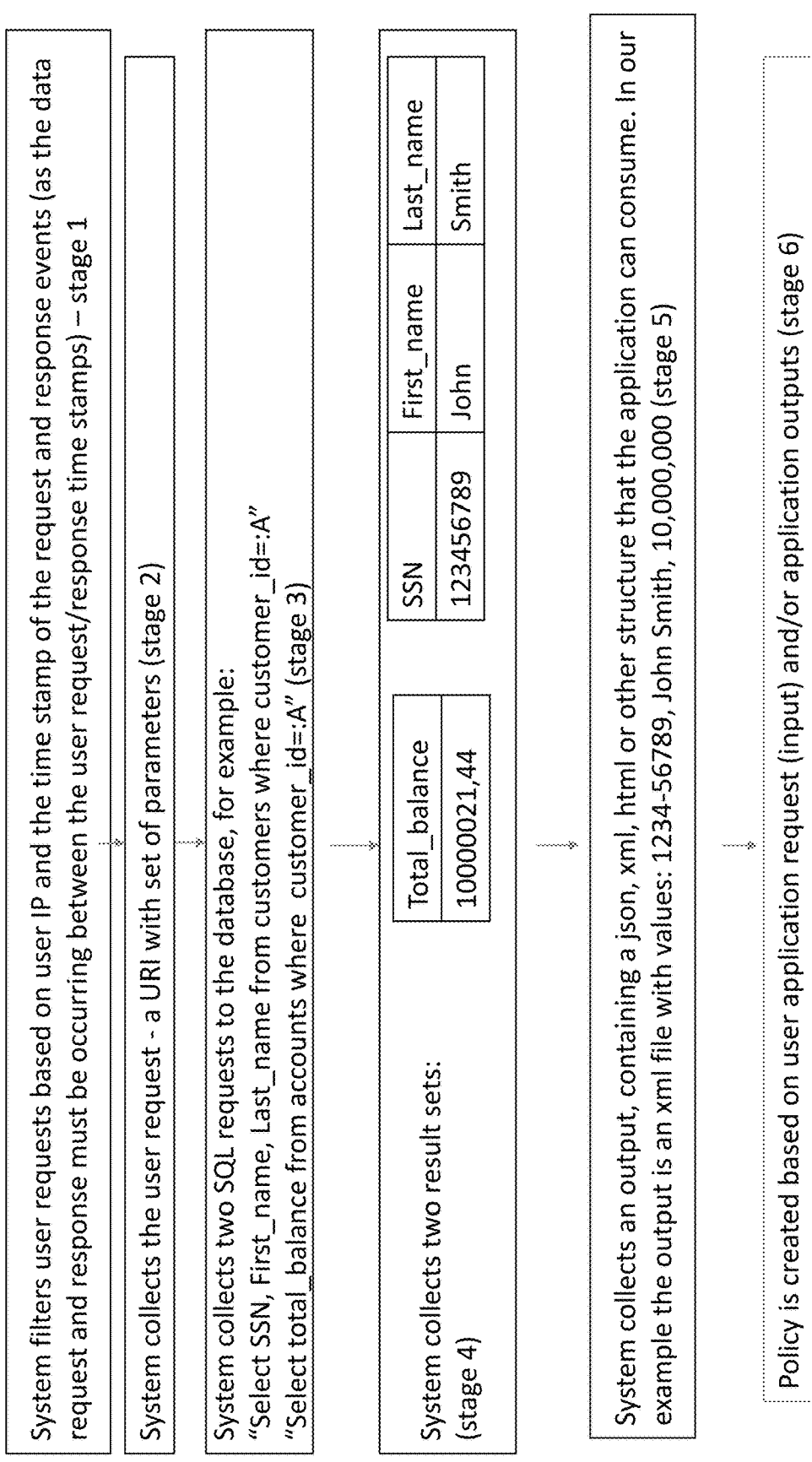

In FIG. 6B, the system uses the entered administrator values to identify the user response, by searching the values in the application outputs sent to the administrator during the time interval in stage 1. In stage 2, the system collects the user application request—a URI with a set of parameters. In stage 3, the system collects the request from the application to the database.

The system then uses the administrator values to identify the data-source response in stage 4. The system uses various data manipulation techniques including but not limited to encoding manipulations, numeric rounding, time and date manipulation, special character (such as spaces, commas, points, end of line), and user defined and predefined value manipulation between different encoding methods and manipulation based on data patterns (such as social security number pattern or credit card pattern) that are custom or shared between different installations of the discovery system like a library. This allows the system to understand the data that is collected in the output form or format in stage 5.

In the example, the system identified the following sensitive data response elements:

1. User response 1234-56789 to be identical to data response 123456789 by removing the '-' sign, detecting that the result set column SSN is sensitive. Based on the parsed SQL request that returned the result set, the system defined the SSN column (that is returning the first column in the result set) in table customers to be sensitive with SSN, risk score 8, classification PII
2. User response John Smith is detected by the system based on a template that identifies the data in the result set by breaking the name into first name and last name. The system identified the values John and Smith in two result set columns First_name (value John) in result set column Last_Name (value Smith), detecting that these result set columns are sensitive. Based on the parsed SQL request that returned the result set, "Select SSN, First_name, Last_name from customers where customer_id=:A", the second and third result set columns are populated from the second and third columns in the SQL request, thus both First_name, Last_name from customers are defined to be sensitive with title: customer name, risk score 10, classification PII
3. User response 10,000,000 to be identical to data response 10000021,44 by applying different rounding functions and number format functions, that produce the 10000021,44 and enables the system identify the sensitive value in Total_balance Based on the parsed SQL "Select total_balance from accounts where customer_id=:A" that returned the result set Total_balance, the system defined the Total_balance column (that is returning the first column in the result set) in table accounts to be sensitive with title: balance, risk score 20, classification PII.

In this example, the data response to the user application by the application server comprises data in a different format than the data response from the data source, such that the data needs to be transformed. Optionally, transforming sensitive data is performed in real time. Alternatively, it is performed in advance, preferably for a plurality of transformations.

Other related data requests and data response that might have the same session tracking id or might be executed in the time interval of the user request and user response are ignored, as they do not relate to the sensitive data that the administrator has specified.

For each sensitive data provided by the user, the system creates a policy for detecting all users that expose the sensitive information. The policy preferably includes a set of matching conditions on all or part of the following application stages: matching based on the user request context (such as the URI value and parameters), matching based on the data source context (such as the SQL, table, column name), matching based on the data response (such as result set titles and structure), and matching based on the user response (such as the JSON/XML structure and parameters). The policy is optionally and preferably created according to one or more of user application request (input), data element and/or application output (stage 6).

The policies can be imported into the application agent or within one of the sensors, for real time detection of sensitive information exfiltration events.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A method for discovering sensitive data, in a system comprising a user application, one or more application servers and a data source in communication through a computer network, the application server operating an application agent, the method comprising:
   a. Selecting or indicating sensitive data in a user request by determining said user request with regard to operation of the user application or an application program interface (API) request;
   b. Detecting a data flow, comprising a data request from the user application and a data response from the data source by the application agent;
   c. Recording said data flow, including the data request and the data response;
   d. Locating the sensitive data in the recording; and
   e. Determining a data lineage for the sensitive data, including each communication between the user application and the data source, said data lineage comprising a set of events in sequence, said events comprising said interactions between the user application and the data source, and data transacted during said events,
   f. wherein said locating the sensitive data further comprises determining a pattern of the sensitive data within total data communicated and determining metadata for the sensitive data, including for each sensitive source data element, a title, sensitivity score, various classifications, a request URI, the sensitivity and classification of the data element.

2. The method of claim 1, further comprising determining a policy for locating the sensitive data in interactions between the user application, the application server and the data source, according to said data lineage and said metadata.

3. The method of claim 2, wherein said determining said policy comprises determining the policy according to said data request from said user application and/or said data response.

4. A method for discovering sensitive data, in a system comprising a user application, an application server, and a data source in communication through a computer network, the application server operating an application agent, the method comprising:
   a. selecting or indicating sensitive data in a user request by determining said user request with regard to operation of the user application or an application program interface (API) request;
   b. detecting a data flow, comprising a data request from the user application and a data response from the data source by the application agent;
   c. recording said data flow, including the data request and the data response;
   d. locating the sensitive data in the recording, wherein locating the sensitive data comprises determining a pattern of the sensitive data within total data communicated, and wherein locating the sensitive data further comprises data element, a title, sensitivity score, various classifications, a request URI, the sensitivity and classification of the data element; and
   e. determining a data lineage for the sensitive data, including each communication between the user application and the data source, said data lineage comprising a set of events in sequence, said events comprising said interactions between the user application and the data source, and data transacted during said events.

* * * * *